P. Bradford,

Coffin Handle.

No. 3723. Reissued Nov. 9. 1869.

Sargent & Company
Assignees of
Purmort Bradford
Inventor

By their Attorney.

Witnesses
J. H. Shumway
A. J. Tibbits

N. PETERS, PHOTO-LITHOGRAPHER, WASHINGTON, D. C.

United States Patent Office.

SARGENT & CO., OF NEW HAVEN, CONNECTICUT, ASSIGNEES OF PURMORT BRADFORD.

*Letters Patent No.* 62,729, *dated March* 12, 1867; *reissue No.* 3,723, *dated November* 9, 1869.

IMPROVED LIFTING-HANDLE FOR COFFINS, &c.

The Schedule referred to in these Letters Patent and making part of the same.

*To all whom it may concern:*

Be it known that PURMORT BRADFORD, of New Haven, in the county of New Haven, and State of Connecticut, invented a new Improvement in Lifting-Handles; and we do hereby declare the following, when taken in connection with the accompanying drawings, and the letters of reference marked thereon, to be a full, clear, and exact description of the same, and which said drawings constitute part of this specification, and represent, in—

Figure 1:
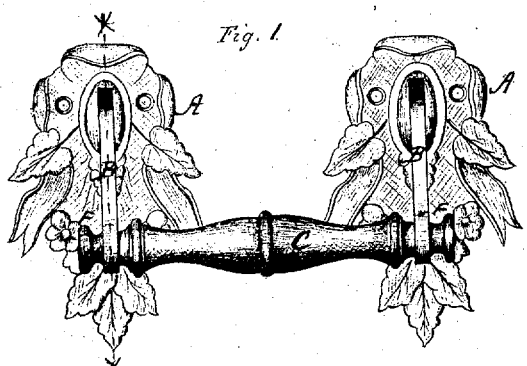
Figure 2:
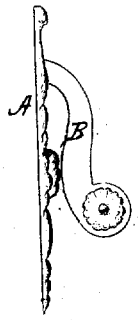
Figure 3:
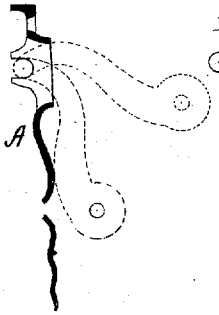

Figure 1, a front view;
Figure 2, an end view;
Figure 3, a section on line *x x;*
Figure 4, a side view of the lever detached;
Figure 5, a front view of the same; and in
Figure 6, a central section through the handle.

This invention is designed with special reference to coffin-handles, but is equally applicable to other lifters; and consists in the peculiar manner of attaching the lifter to the socket, whereby the use of rivets or projecting sockets is dispensed with, and the construction of the handle consequently cheapened; also, in the arrangement of a tubular handle between the two levers, so that the said handle will be held in a central position, a bolt or rod passing through the handle and the two levers, to bind the handle and levers together.

A A are the two sockets.
B B, the levers.
C, the handle which connects the two.

Figure 6:
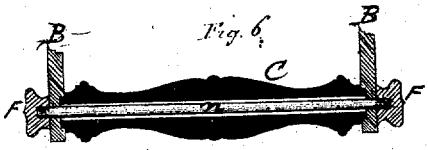

The handle consists of a hollow cylinder, of any desirable form, extending between the two levers, with a rod, *n*, passing through the handle and two lifters, as seen in fig. 6; and upon the outside, nuts or heads F are placed, so as to bind the levers and handle together, by means of the said rod *n*.

To insure the holding of the cylinder or handle C in its proper position, a recess is formed in the levers, to receive a boss or shoulder upon the end of the handle, and into which the ends of the handle extend, so that when the two levers are bound to the handle by the rod *n*, the handle cannot be moved from its proper position.

It will be evident to those skilled in the art that this central position may be maintained by reversing the construction, that is, forming the boss or projection on the levers to enter into the ends of the cylinder or handle, or other equivalent means may be employed, it being essential that the handle be supported in a central fixed position around the rod.

For convenience, one or both of the heads are screwed on to the rod, but if desired, the rod may extend through the heads, and be riveted thereon.

Figure 4:
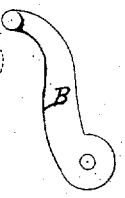
Figure 5:
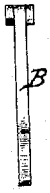

The lever B is formed as seen in figs. 4 and 5, with a trunnion, *a*, on either side, at its upper end.

The socket is formed with a vertical slot, *d*, (see figs. 1 and 2,) upon either side of the said slot; and upon the under side, and midway of the socket, projecting ears *e* are formed, which form a seat to receive the trunnions *a*, as denoted in fig. 3.

The thickness of the lever B must be less or no more than the width of the slot *d*, so that the lever may be passed through the slot in the socket from the back side, and when the two levers are so passed through, they are united at their lower end by the handle C.

The curve of the lever and the length of the slot *d* should be such that the lifter may drop to the position denoted in fig. 1, and in broken lines, fig. 3, and also that when raised to the position denoted in broken lines, fig. 3, the lever will strike the upper end of the slot, which forms a stop for the handle.

By this arrangement, the projecting ears or sockets commonly used are dispensed with, and the face of the socket flush, or but little raised from the ornamentation surrounding it.

It is known that hollow or tubular handles, thus secured with fixed arms, are not new; this invention applying only to swinging levers.

We claim, as the invention of the said PURMORT BRADFORD—

1. The socket A, formed with a vertical slot, *d*, provided midway with a seat to receive the trunnion *a*, constructed and arranged to operate as herein described, as an article of manufacture.

2. The combination of the hollow cylinder or handle C with the swinging levers B B, and rod *n* passing through the cylinder and levers, so as to bind the handle and swinging levers together, when constructed substantially as described, so that the handle will be retained in its fixed position between the two levers.

SARGENT & CO.,
By J. B. SARGENT, *President.*

Witnesses:
A. J. TIBBITS,
J. H. SHUMWAY.